3,424,761
3-UREIDOPYRROLIDINES

Grover C. Helsley and Carl D. Lunsford, Richmond, Va., assignors to A. H. Robins Company, Incorporated, Richmond, Va., a corporation of Virginia
No Drawing. Filed Mar. 7, 1966, Ser. No. 532,105
U.S. Cl. 260—326.3
Int. Cl. C07d 27/04; A61k 27/00
24 Claims

ABSTRACT OF THE DISCLOSURE

New 1 - (3-pyrrolidinyl) - 3 - substituted-phenyl ureas, characterized by analgetic, central nervous system, and psychopharmacologic activities.

---

The present invention relates to certain novel heterocyclic organic compounds which may be referred to as substituted 3-ureidopyrrolidines, and is more particularly concerned with 1-(3-pyrrolidinyl) - 3 - substituted-phenyl ureas, compositions thereof, and methods of making and using the same.

The invention is especially concerned with novel 3-ureidopyrrolidines having the formula:

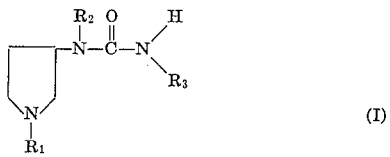

(I)

wherein $R_1$ is selected from the group consisting of hydrogen, lower-alkyl, lower-cycloalkyl, phenyl, and benzyl and other phenyl lower-alkyl,
wherein $R_2$ is selected from the group consisting of hydrogen, lower-alkyl, and phenyl, and
wherein $R_3$ is selected from the group consisting of lower-alkylphenyl, lower-alkoxyphenyl, halophenyl, trifluoromethylphenyl, phenyl, and lower-alkyl,
$R_2$ being phenyl when $R_3$ is phenyl or lower-alkyl, and acid addition salts thereof.

The compounds of the invention having the foregoing Formula I are generally characterized by important pharmacological activity, and exhibit analgetic, central nervous system and psychopharmacologic activities. More specifically, the present compounds may be utilized in such applications as appetite suppression, CNS stimulation, anticonvulsant activity, and sedation. In addition, the compounds are relatively non-toxic and exhibit advantageous therapeutic ratios.

The activity of the active agents of the present invention has been evidenced by tests in lower animals. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide new and useful 1 - (3-pyrrolidinyl)-3-substituted phenyl ureas, compositions thereof, and methods of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower alkoxy" has the formula —O—lower-alkyl. The term "lower-cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. "Pentyl-lower-alkyl" are groups such as benzyl, phenethyl, methylbenzyl, phenpropyl, and the like.

Among the suitable substituted phenyl radicals within the scope of $R_3$ are phenyl radicals substituted by any radical or radicals which are not reactive or otherwise interfering under the conditions of reaction, such as lower-alkoxy, lower-alkyl, trifluoromethyl, and halo, e.g., chloro, fluoro, or bromo. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl and lower-alkoxy substituents each have preferably from one to four carbon atoms which can be arranged as straight or branched chains. A total of nine carbon atoms in all ring substituents is the preferred maximum.

When halogen is referred to herein, preferably but not necessarily a halogen of atomic weight in excess of nineteen but not greater than eighty is employed. Of the halogens, chlorine is preferred.

The compounds of Formula I may be converted to and are most conveniently employed in the form of non-toxic pharmaceutically acceptable acid addition salts. Such salts also have improved water-solubility. Although the non-toxic salts are preferred, any salt may be prepared for use as a chemical intermediate, as in the preparation of another but non-toxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acide addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salt is the fumarate.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

Method of preparation

The preparation of 1-substituted-3-ureidopyrrolidines (I) may be accomplished by mixing and reacting the appropriately substituted 3-aminopyrrolidine (II) with a substituted isocyanate (III). The reaction sequence is illustrated by the following:

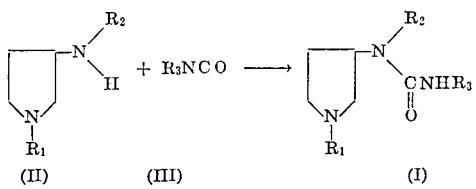

$R_1$ being other than hydrogen in this sequence.

The reaction of the active hydrogen present on the amino group of the pyrrolidine (II) is carried out in an aprotic solvent such as benzene by the slow addition of the selected isocyanate. The reaction conditions may be varied dependent on the type of isocyanate employed. In the case of aryl isocyanates, the rate of reaction is more rapid and the temperature of the reaction and the reaction time are therefore shorter than would be required for the less reactive alkyl isocyanates.

For the preparation of a compound of Formula I, wherein $R_1$ is hydrogen, debenzylation involving hydrogenolysis of a compound of Formula I, wherein $R_1$ is benzyl, is employed, vide Examples 1, 14 and 15.

A general procedure for the preparation of the 3-ureidopyrrolidines (I) by reaction with a substituted isocyanate is described below.

General method for the preparation of 3-ureidopyrrolidines

A solution composed of a 1-substituted-3-aminopyrrolidine in a dry aprotic solvent, such as benzene, is placed in a three-neck round-bottom flask fitted with a stirrer, thermometer, dropping funnel and reflux condenser (fitted with a drying tube). While maintaining the temperature at approximately 5–25° C., an equimolar amount of organic isocyanate is added dropwise by means of the dropping funnel. The length of time required for the addition of the isocyanate may range from 0.5–1.0 hour. On completing the addition of the isocyanate to the 3-aminopyrrolidine, the reaction mixture is stirred for several hours while being maintained at room temperature. The product is then isolated by evaporating the solvent under reduced pressure, as for example in a rotary evaporator. The solid product obtained after removal of the solvent may be purified in an appropriate manner such as recrystallization from selected solvents. A liquid product is usually converted to a salt, e.g., the fumarate.

The following examples are given by way of illustration only and are not to be construed as limiting.

EXAMPLE 1

1-(3-pyrrolidinyl)-3-(3,4,5-trimethoxyphenyl)-urea

A solution of 13.5 g. (0.035 mole) of 1-(1-benzyl-3-pyrrolidinyl)-3-(3,4,5-trimethoxyphenyl)-urea in 250 ml. of 95% ethanol was placed in the reaction bottle of the catalytic reduction apparatus and 5 g. of 10% palladium-on-charcoal catalyst was added. The mixture was shaken with hydrogen until the pressure drop indicated one equivalent of hydrogen was absorbed (ca. 2 hours). After cooling, the suspension was filtered, and the solvent was evaporated at reduced pressure. The white crystalline residue weighed 8.5 g. (82% yield) and melted at 145–148° C. after it was washed with isooctane. After the product was recrystallized several times from benzene, it melted at 148–149.5° C.

Analysis calculated for $C_{14}H_{21}N_3O_4$.—C, 56.93; H, 7.17; N, 14.22. Found: C, 57.04; H, 7.13; N, 14.09.

EXAMPLE 2

1-(4-chlorophenyl)-3-(1-methyl-3-pyrrolidinyl)-urea

To a cooled (ca. 10° C.) stirred solution of 1.0 g. (0.01 mole) of 3-amino-1-methylpyrrolidine in 30 ml. of benzene was added over a period of 15 minutes to a solution of 1.5 g. (0.01 mole) of p-chlorophenyl isocyanate in 30 ml. of benzene (a white precipitate formed during the addition of the isocyanate). After the mixture was stirred for two hours at room temperature, 30 ml. of isooctane was added to the reaction flask. The product was separated by filtration and recrystallized from benzene containing a small amount of isopropanol. The pure compound weighed 2.4 g. (96% yield) and melted at 182.5–183.5° C.

Analysis calculated for $C_{12}H_{16}ClN_3O$.—C, 56.80; H, 6.36; N, 16.56. Found: C, 56.99; H, 6.35; N, 16.34.

EXAMPLE 3

1-(1-methyl-3-pyrrolidinyl)-3-(3,4,5-trimethoxyphenyl)-urea

To a cooled (ca. 10° C.) stirred solution of 2.0 g. (0.02 mole) of 3-amino-1-methylpyrrolidine in 30 ml. of benzene was added over a period of 15 minutes a solution of 4.2 g. (0.02 mole) of 3,4,5-trimethoxyphenyl isocyanate in 30 ml. of benzene. After the mixture was stirred for two hours at room temperature, 50 ml. of isooctane was added to the reaction flask. The product which crystallized was separated by filtration and recrystallized from a benzene-isooctane mixture. The white compound weighed 5.1 g. (81% yield) and melted at 161–162.5° C.

Analysis calculated for $C_{15}H_{23}N_3O_4$.—C, 58.24; H, 7.49; N, 13.58. Found: C, 58.19; H, 7.54; N, 13.46.

EXAMPLE 4

1-(1-isopropyl-3-pyrrolidinyl)-3-(4-methoxyphenyl)-urea

To a cooled (ca. 10° C.) stirred solution of 3.8 g. (0.03 mole) of 3-amino-1-isopropylpyrrolidine in 50 ml. of benzene was added over a period of 15 minutes a solution of 4.5 g. (0.03 mole) of p-methoxyphenyl isocyanate in 25 ml. of benzene (a white precipitate formed during the addition of the isocyanate). After the reaction was stirred for two hours at room temperature, 40 ml. of isooctane was added to the reaction flask. The crystalline product which was separated by filtration weighed 7.2 g. (87% yield) and melted at 142.5–144° C. The analytical sample melted at 143.5–144.5° C. after it was recrystallized from benzene.

Analysis calculated for $C_{15}H_{23}N_2O_2$.—C, 64.95; H, 8.36; N, 15.15. Found: C, 64.79; H, 8.47; N, 15.18.

EXAMPLE 5

1-(1-benzyl-3-pyrrolidinyl)-3-(3,4,5-trimethoxyphenyl)-urea

To a cooled (ca. 10° C.) stirred solution of 9.7 g. (0.055 mole) of 3-amino-1-benzylpyrrolidine in 50 ml. of dry benzene was added over a period of 20 minutes a solution of 11.5 g. (0.055 mole) of 3,4,5-trimethoxyphenyl isocyanate in 20 ml. of benzene. After the mixture was stirred for 16 hours at room temperature, the solvent was evaporated. Thin layer chromatography indicated that the reaction was essentially quantitative. The viscous oil, which would not form a crystalline fumarate, hydrochloride or hydroiodide salt, crystallized on standing. The white product melted at 112.5–114.5° C. after it was recrystallized several times from a benzene-isopropyl ether mixture.

Analysis calculated for $C_{21}H_{27}N_3O_4$.—C, 65.43; H, 7.06; N, 10.90. Found: C, 65.39; H, 7.22; N, 11.01.

EXAMPLE 17

1-(1-isopropyl-3-pyrrolidinyl)-1,3-diphenyl-urea

To a cooled solution (5–10° C.) of 20.4 g. (0.10 mole) of 1-isopropyl-3-anilinopyrrolidine in 60 ml. of benzene was added slowly 12.0 g. (0.10 mole) of phenyl isocyanate in 50 ml. of benzene. The mixture was stirred for thirty minutes at 5–10° C., fourteen hours at room temperature, and finally two hours at 60° C. The solvent was evaporated at reduced pressure and the viscous oily residue was dissolved in hot isopropyl ether. Upon cooling a white crystalline product formed. After the crude material was recrystallized several times from isopropyl ether, it weighed 23 g. (71% yield) and melted at 75–76° C. The product was soluble in dimethyl formamide and polyethylene glycol-M.W. 400.

Analysis calculated for $C_{29}H_{25}N_3O$.—C, 74.27; H, 7.79; N, 12.99. Found: C, 74.37; H, 7.42; N, 13.12.

EXAMPLE 18

1-(1-isopropyl-3-pyrrolidinyl)-1-phenyl-3-(n-butyl)-urea fumarate

To a solution of 30 g. (0.149 mole) of 1-isopropyl-3-anilinopyrrolidine in 100 ml. of benzene was added 31.6 g. (0.298 mole) of freshly distilled (B.P. 112–114° C.) n-butyl isocyanate. The mixture was refluxed for fifteen minutes and allowed to stand for sixteen hours. The solvent and excess isocyanate were removed by distillation at reduced pressure. The residual oil weighed 45 g. (98% yield) and showed a strong carbonyl bond (5.9 microns) in its infrared absorption spectrum. The free base could not be purified by distillation at reduced pressure because of decomposition. HCl in ether on the free base gave an oil.

Thirty-five grams (0.115 mole) of the urea (base) was added to 100 ml. of dry isopropanol containing 13.3 g. (0.115 mole) of fumaric acid. The mixture was heated. Upon cooling an oil separated which crystallized on standing. The crude product was recrystallized from an isopropyl ether-isopropanol mixture.

Yield, 32 g. (66%); M.P. 137–139° C.

A mixed melting point determination on the product and the fumarate of the starting material showed a depression (120–133° C.).

Analysis calculated for $C_{22}H_{33}N_3O_5$: C, 62.99; H, 7.93; N, 10.02. Found: C, 62.79; H, 7.78; N, 9.83.

EXAMPLE 19

1-(1-isopropyl-3-pyrrolidinyl)-1-phenyl-3-ethylurea

A mixture of 20.4 g. (.1 mole) of 1-isopropyl-3-anilinopyrrolidine, 9.0 g. (.13 mole) of ethyl isocyanate and 100 g. of benzene was stirred for forty hours at room temperature and two hours at 60° C. The solvent was evaporated at reduced pressure; the residual oil weighed 27.5 g. and exhibited a strong carbonyl absorption band at 6.08 microns in its infrared absorption spectrum.

A suspension of 22.5 g. (.08 mole) of the oil, 9.5 g. (.08 mole) of fumaric acid and 100 ml. of isopropanol was stirred at 60° C. for one hour. The clear solution was filtered and diluted with isopropyl ether; the oil which separated crystallized on standing. After the crude product was recrystallized from an isopropanol-isopropyl ether mixture, it weighed 19 g. (59% yield) and melted at 132–135° C. The pure compound melted at 134–136° C. after it was recrystallized several times from the same solvent mixture.

Analysis calculated for $C_{20}H_{29}N_3O_5$: C, 61.36; H, 7.47; N, 10.73. Found: C, 61.23; H, 7.57; N, 10.94.

EXAMPLE 20

1-(1-isopropyl-3-pyrrolidinyl)-1-phenyl-3-methylurea

To a cooled, stirred solution of 15.3 g. (.075 mole) of 1-isopropyl-3-anilinopyrrolidine in 50 ml. of benzene was added 4.6 g. (.080 mole) of methyl isocyanate in 50 ml. of benzene. The mixture was stirred for 112 hours at room temperature and the solvent was evaporated at reduced pressure. The residual oil which weighed 19.5 g. crystallized on standing. After the crude product was recrystallized twice from ligroin, it melted at 84–86° C. and weighed 12 g. (61% yield). After several additional recrystallizations the pure compound melted at 85–86.5° C.

This substituted urea was soluble in water (5%+), dimethylformamide and polyethylene glycol—M.W. 400.

Analysis calculated for $C_{15}H_{23}N_3O$: C, 68.93; H, 8.87; N, 16.08. Found: C, 69.17; H, 9.10; N, 15.73.

EXAMPLE 21

1-(1-methyl-3-pyrrolidinyl)-1-phenyl-3-methylurea

To a cooled, stirred solution of 17.6 g. (0.1 mole) of 3-anilino-1-methylpyrrolidine in 50 ml. of dry benzene was added 5.7 g. (0.10 mole) of methyl isocyanate in 50 ml. of dry benzene. The flask and reflux condenser were protected by a calcium chloride drying tube. The mixture was stirred for 64 hours at room temperature and then refluxed for one hour. The solvent was distilled at reduced pressure and the solid residue was recrystallized from an isooctane-benzene mixture. The white product weighed 18.7 g. (81% yield) and melted at 97–99° C. After the compound was recrystallized again from the same solvent mixture, it melted at 98–99° C.

Analysis calculated for $C_{13}H_{19}N_3O$: C, 66.92; H, 8.21; N, 18.01. Found: C, 67.00; H, 8.31; N, 17.81.

EXAMPLE 22

1-(1-ethyl-3-pyrrolidinyl)-1-phenyl-3-(n-butyl)-urea fumarate

To a solution of 28.5 g. (0.15 mole) of 1-ethyl-3-anilinopyrrolidine in 100 ml. of dry benzene was added 31.6 g. (0.3 mole) of n-butyl isocyanate. The mixture was refluxed for four hours and allowed to stand for sixteen hours at room temperature. The solvent and excess isocyanate were removed by distillation at reduced pressure. The residual oil weighed 43.5 g. (98% yield) and exhibited a strong carbonyl absorption band (5.98 microns) in its infrared absorption spectrum.

Twenty-five g. (0.87 mole) of the urea derivative was added to 75 ml. of dry isopropanol containing 10.0 g. (0.087 mole) of fumaric acid. The mixture was heated and then diluted with isopropyl ether. The oil which separated upon cooling crystallized on standing. The crude product was recrystallized from an isopropyl ether-isopropanol mixture.

Yield: 22 g. (63%); M.P. 110–112° C.

Analysis calculated for $C_{21}H_{31}N_3O_5$: C, 62.20; H, 7.71; N, 10.36. Found: C, 62.23; H, 7.61; N, 10.59.

Formulation and administration

Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their nontoxic acid-addition salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be

EXAMPLE 6

1-methyl-1-(1-phenyl-3-pyrrolidinyl)-3-(p-methoxyphenyl)-urea

A stirred solution of 8 g. (0.045 mole) of 1-phenyl-3-methylaminopyrrolidine in 100 ml. of dry benzene was treated dropwise with 6.7 g. (0.045 mole) of p-methoxyphenyl isocyanate in 50 ml. of dry benzene and allowed to stir an additional 30 minutes. The resulting crystalline product was filtered off and washed with benzene; yield 12.2 g. (83%); M.P. 165–167° C. An analytical sample recrystallized from benzene-isooctane melted at 164–166° C.

Analysis calculated for $C_{19}H_{23}N_3O_2$.—C, 70.13; H, 7.12; N, 12.91. Found: C, 70.38; H, 7.11; N, 12.92.

EXAMPLE 7

1-(1-methyl-3-pyrrolidinyl)-3-(p-methoxphenyl)-1-phenylurea

To a cooled (ca. 10° C.) stirred solution of 10.6 g. (0.06 mole) of 1-methyl-3-anilinopyrrolidine in 50 ml. of benzene was added slowly over a period of 15 minutes a solution of 8.9 (0.06 mole) of p-methoxyphenyl isocyanate in 300 ml. of benzene. After the mixture was stirred one hour at room temperature, 100 ml. of isooctane was added to the reaction flask. The product was separated by filtration and recrystallized from isopropyl ether. The crude compound weight 8.9 g. (46% yield) and melted at 124–128° C. After the urea was treated with charcoal and recrystallized several times from the same solvent, it melted at 129–130.5° C.

Analysis calculated for $C_{19}H_{23}N_3O_2$.—C, 70.13; H, 7.12; N, 12.91. Found: C, 69.99; H, 7.18; N, 13.00.

EXAMPLE 8

1-(1-phenyl-3-pyrrolidinyl)-3-(4-methoxyphenyl)-urea

A stirred solution of 4 g. (0.025 mole) of 1-phenyl-3-aminopyrrolidine in 50 ml. of dry benzene was treated dropwise under a nitrogen atmosphere with 3.7 g. (0.025 mole) of p-methoxyphenyl isocyanate in 30 ml. of dry benzene. After stirring for 30 minutes the resulting crystalline precipitate was filtered off; yield 7.0 g. (92%); M.P. 179–181° C. An analytical sample was recrystallized from benzene.

Analysis calculated for $C_{18}H_{21}N_3O_2$.—C, 69.43; H, 6.80; N, 13.50. Found: C, 69.64; H. 6.91; N, 13.53.

EXAMPLE 9

1-(4-methoxyphenyl)-3-(1-methyl-3-pyrrolidinyl)-urea

Using the method of Example 2, equimolar amounts of 3-amino-1-methylpyrrolidine and p-methoxyphenyl isocyanate were mixed and reacted together to give 1-(4-methoxyphenyl)-3-(1-methyl-3-pyrrolidinyl)-urea. The pure compound was obtained in 88% yield and melted at 159–160° C.

Analysis calculated for $C_{13}H_{19}N_3O_2$.—C, 62.63; H, 7.68; N, 16.86. Found: C, 62.79; H, 7.75; N, 16.89.

EXAMPLE 10

1-(1-ethyl-3-pyrrolidinyl)-3-(4-methoxyphenyl)urea

Using the method of Example 2, equimolar amounts of 3-amino-1-ethylpyrrolidine and p-methoxyphenyl isocyanate were mixed and reacted together to give 1-(1-ethyl-3-pyrrolidinyl)-3-(4-methoxyphenyl)-urea. The pure compound was obtained in 82% yield and had a melting point of 129–130° C.

Analysis calculated for $C_{14}H_{21}N_3O_2$.—C, 63.85; H, 8.04; N, 15.96. Found: C, 63.92; H, 8.13; N, 15.78.

EXAMPLE 11

1-(1-benzyl-3-pyrrolidinyl)-3-(4-methoxyphenyl)urea

Using the method of Example 2, equimolar amounts of 3-amino-1-benzylpyrrolidine and 4-methoxyphenyl isocyanate were mixed and reacted together to give 1-(1-benzyl-3-pyrrolidinyl)-3-(4-methoxyphenyl)-urea. The pure compound was obtained in 91% yield and had a melting point of 133–134° C.

Analysis: calculated for $C_{19}H_{23}N_3O_2$.—C, 70.13, H, 7.12; N, 12.91. Found. C, 70.33; H. 6.80; N, 12.98.

EXAMPLE 12

1-(1-cyclohexyl-3-pyrrolidinyl)-3-(4-methoxyphenyl)-urea

Using the method of Example 2, equimolar amounts of 3-amino-1-cyclohexylpyrrolidine and p-methoxyphenyl isocyanate were mixed and reacted together to give 1-(1-cyclohexyl-3-pyrrolidinyl)-3-(4-methoxyphenyl)-urea. The purified compound was obtained in 82% yield and had a melting point of 163–164° C.

Analysis calculated for $C_{18}H_{27}N_3O$.—C, 68.11; H, 8.57; N, 13.24. Found: C, 68.35; H. 8.77; N, 13.43.

EXAMPLE 13

1-(1-n-butyl-3-pyrrolidinyl)-3-(4-methylphenyl)-1-phenylurea

Using the method of Example 2, equimolar amounts of 1-n-butyl-3-anilinopyrrolidine and p-methylphenyl isocyanate are mixed and reacted together to give 1-(1-n-butyl-3-pyrrolidinyl)-3-(4-methylphenyl)-1-phenylurea.

EXAMPLE 14

1-(3-pyrrolidinyl)-3-(4-trifluoromethylphenyl)-urea

Using the method of Example 2, equimolar amounts of 3-amino-1-benzylpyrrolidine and p-trifluoromethylphenyl isocyanate are mixed and reacted together to give 1-(1-benzyl-3-pyrrolidinyl)-3-(4-trifluoromethylphenyl)-urea. Hydrogenolysis of the benzyl radical using the method of Example 1 gives 1-(3-pyrrolidinyl)-3-(4-trifluoromethylphenyl)-urea.

EXAMPLE 15

1-(3-pyrrolidinyl)-3-(4-methoxyphenyl)-urea

A solution of 6.5 g. (0.02 mole) of 1-(1-benzyl-3-pyrrolidinyl)-3-(4-methoxyphenyl)-urea in 200 ml. of 95% ethanol was placed in the reaction bottle of the catalytic reduction apparatus and 4 g. of 10% palladium-on-charcoal catalyst was added. The mixture was shaken with hydrogen until the pressure drop indicated one equivalent of hydrogen was absorbed (ca. one hour). After cooling, the suspension was filtered, and the solvent evaporated at reduced pressure. The white crystalline residue was recrystallized from benzene yielding 2.8 g. (59% yield) of product melting at 130–132° C. The analytical sample melted at 131–132.5° C. after it was recrystallized several times from the same solvent. The reaction was run on a larger scale and a comparable yield of product obtained.

Analysis calculated for $C_{12}H_{17}N_3O_2$.—C, 61.25; H, 7.28; N, 17.86. Found: C, 61.02; H, 7.33; N, 17.80.

EXAMPLE 16

1,3-diphenyl-1-(1-methyl-3-pyrrolidinyl)-urea

To a cooled solution (10–15° C.) of 26.4 g. (0.15 mole) of 1-methyl-3-anilinopyrrolidine in 70 g. of benzene was added slowly with stirring a cooled solution of 17.9 g. (0.15 mole) of phenyl isocyanate in 60 ml. of benzene. The reaction mixture was stirred an additional thirty minutes at 15–25° C. and the solvent evaporated at reduced pressure. The residual oil was dissolved in isopropyl ether and upon cooling the product crystallized. After the compound was recrystallized several times from isopropyl ether, it melted at 87–88° C. and weighed 32 g. (72% of theoretical yield).

The infrared spectrum of the pure product exhibited a strong carbonyl absorption band at 5.93 microns.

Analysis calculated for $C_{18}H_{21}N_3O$.—C, 73.19; H, 7.17; N, 14.23. Found: C, 72.97; H, 7.06; N, 14.09.

combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles. Results upon administration of these novel materials have thus far proved extremely gratifying.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of compounds having the formula:

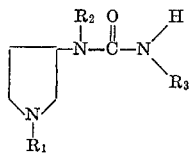

wherein $R_1$ is selected from the group consisting of hydrogen, lower-alkyl, lower-cycloalkyl, phenyl, and phenyl-lower-alkyl,
wherein $R_2$ is selected from the group consisting of hydrogen, lower-alkyl, and phenyl, and
wherein $R_3$ is selected from the group consisting of lower-alkylphenyl, lower-alkoxyphenyl, halophenyl, trifluoromethylphenyl, phenyl, and lower-alkyl,
$R_2$ being phenyl when $R_3$ is phenyl and lower-alkyl, and acid addition salts thereof.

2. A compound of claim 1 which is 1-(3-pyrrolidinyl)-3-(3,4,5-trimethoxyphenyl)-urea.

3. A compound of claim 1 which is 3-(4-chlorophenyl)-1-(1-methyl-3-pyrrolidinyl)-urea.

4. A compound of claim 1 which is 1-(1-methyl-3-pyrrolidinyl)-3-(3,4,5-trimethoxyphenyl)-urea.

5. A compound of claim 1 which is 1-(1-isopropyl-3-pyrrolidinyl)-3-(4-methoxyphenyl)-urea.

6. A compound of claim 1 which is 1-(1-benzyl-3-pyrrolidinyl)-3-(3,4,5-trimethoxyphenyl)-urea.

7. A compound of claim 1 which is 1-methyl-1-(1-phenyl-3-pyrrolidinyl)-3-(p-methoxyphenyl)-urea.

8. A compound of claim 1 which is 1-(1-methyl-3-pyrrolidinyl)-3-(p-methoxyphenyl)-1-phenylurea.

9. A compound of claim 1 which is 1-(1-phenyl-3-pyrrolidinyl)-3-(4-methoxyphenyl)-urea.

10. A compound of claim 1 which is 3-(4-methoxyphenyl)-1-(1-methyl-3-pyrrolidinyl)-urea.

11. A compound of claim 1 which is 1-(1-ethyl-3-pyrrolidinyl)-3-(4-methoxyphenyl)-urea.

12. A compound of claim 1 which is 1-(1-benzyl-3-pyrrolidinyl)-3-(4-methoxyphenyl)-urea.

13. A compound of claim 1 which is 1-(1-cyclohexyl-3-pyrrolidinyl)-3-(4-methoxyphenyl)-urea.

14. A compound of claim 1 which is 1-(3-pyrrolidinyl)-3-(4-methoxyphenyl)-urea.

15. A compound of claim 1 which is 1,3-diphenyl-1-(1-methyl-3-pyrrolidinyl)-urea.

16. A compound of claim 1 which is 1-(1-isopropyl-3-pyrrolidinyl)-1,3-diphenyl-urea.

17. A compound of claim 1 which is a 1-(1-isopropyl-3-pyrrolidinyl)-1-phenyl-3-(n-butyl)-urea pharmaceutically acceptable acid addition salt.

18. A compound of claim 1 which is 1-(1-isopropyl-3-pyrrolidinyl)-1-phenyl-3-ethylurea.

19. A compound of claim 1 which is 1-(1-isopropyl-3-pyrrolidinyl)-1-phenyl-3-methylurea.

20. A compound of claim 1 which is 1-(1-methyl-3-pyrrolidinyl)-1-phenyl-3-methylurea.

21. A compound of claim 1 which is a 1-(1-ethyl-3-pyrrolidinyl)-1-phenyl-3-(n-butyl)-urea pharmaceutically acceptable acid addition salt.

22. A compound of claim 1 which is a 1-(1-lower-alkyl-3-pyrrolidinyl)-3-(methoxyphenyl)-urea.

23. A compound of claim 1 which is a 1-(1-lower-alkyl-3-pyrrolidinyl)-1-phenyl-3-lower-alkylurea.

24. A compound of claim 1 which is a 1,3-diphenyl-1-(1-lower-alkyl-3-pyrrolidinyl)-urea.

References Cited

UNITED STATES PATENTS 3,232,933   2/1966   Gundel _____ 260—247.1

ALEX MAZEL, *Primary Examiner.*

JOSE TOVAR, *Assistant Examiner.*

U.S. Cl. X.R.

260—999

UNITED STATES PATENT OFFICE
CERTIFICATE OF CORRECTION

Patent No. 3,424,761                          January 28, 1969

Grover C. Helsley et al.

It is certified that error appears in the above identified patent and that said Letters Patent are hereby corrected as shown below:

Column 2, line 11, "Pentyl" should read -- Phenyl --; line 53, "acide" should read -- acid --. Column 4, line 9, "15 minutes to a" should read -- 15 minutes a --. Column 5, line 17, "(p-methoxpyhenyl)-" should read -- (p-methoxyphenyl)- --; lines 60 and 71, "phenyl)urea", each occurrence, should read -- phenyl)-urea --. Column 7, line 17, "$C_{29}$" should read -- $C_{20}$ --.

Signed and sealed this 24th day of March 1970.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents